June 27, 1933.　　V. A. DE VULITCH　　1,915,720

CLAMPING COLLAR

Filed June 1, 1932

V. A. de Vulitch
INVENTOR

By: Marks & Clerk
Attys.

Patented June 27, 1933

1,915,720

UNITED STATES PATENT OFFICE

VLADIMIR ANTOINE DE VULITCH, OF PARIS, FRANCE

CLAMPING COLLAR

Application filed June 1, 1932, Serial No. 614,761, and in France June 9, 1931.

This invention relates to improvements in a clamping collar for the attachment of rubber or like pipes on metallic unions essentially constituted by a thin metal loop to which is attached a flexible metal band, and through which freely passes a screw which engages with a movable nut guided between the side walls of the loop, and adapted to lock the flexible metal band surrounding the rubber pipe after the said band has been suitably put under tension, in order to firmly embrace the said rubber pipe throughout the periphery of the metal union or connection.

The present invention has for its object an improvement in this type of clamping collar, in order to allow the loop, to which the flexible metal band is attached by one of its ends, to become distorted during the pull exerted on the same, and to exactly fit by its lower face, on the rubber pipe, thus ensuring the compression of the latter throughout its periphery, without any solution of continuity.

In order that the invention may be more clearly understood, the clamping collar forming the subject-matter of the same will be described hereinafter with reference to the accompanying drawing, in which.

Figure 1:
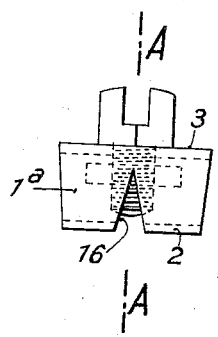
Fig. 1 is a front elevation of the loop.
Figure 2:
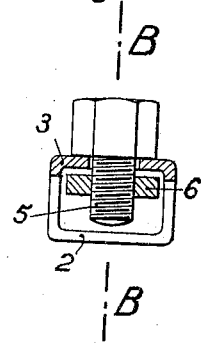
Figs. 2 and 3 are sections of the same loop, made respectively according to lines A—A of Fig. 1 and B—B of Fig. 2.
Figure 3:
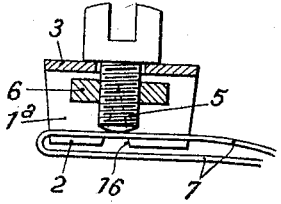

As illustrated in the accompanying drawing, the clamping collar has a loop which is in the shape of a short flat tube of metal having two superposed cross members 2 and 3 connected parallel to each other by the two side walls 1ª of the said loop.

The screw 5, which freely passes through a hole of the upper cross member 3 and engages with the nut 6 mounted in the loop so that it cannot turn therein, projects above the said cross member 3 in the shape of a polygonal head which is slotted so that it can be operated by means of a suitable tool, wrench, screw-driver, etc.

According to the invention, the above loop, to the lower cross member 2 of which the flexible metal band 7 is attached by a bent end, is provided with a slot 16 which extends upwardly on a portion of the sides 1ª and throughout the width of the lower cross member 2 of the said loop.

The flexible metal band 7 being attached to one of the ends of the cross member 2 of the slotted loop, surrounds only once the rubber pipe b to be attached on the metallic connection a, as shown in the example illustrated, and its free end is inserted in the said slotted loop, projecting to a certain distance outside the latter.

By inserting the free end of the band 7 in the slot of a pin or rod and by then causing the said pin to rotate about its longitudinal axis, it will be understood that the band 7 is wound and that a pull is exerted on the latter so that it firmly clamps the rubber pipe on the metallic connection.

Figure 4:
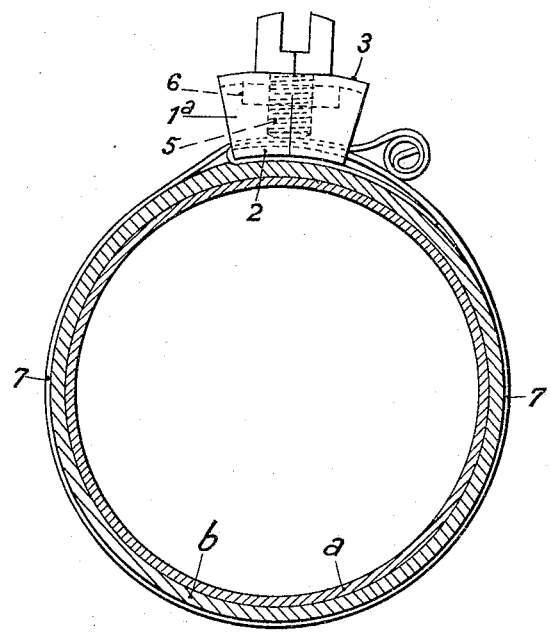
Fig. 4 is an elevation showing the collar fitted on a pipe.

During this tensioning of the band 7, the two divided portions of the lower cross member 2 of the slotted loop, are drawn together and come in contact, thus compelling this lower cross member to curve, as shown in Fig. 4, and to take the shape of the rubber pipe which is thereby firmly embraced on its entire periphery by the band 7 and the lower inwardly curved face of the slotted loop to which the said band is attached, this band, after suitable tensioning, being locked by tightening the screw 5.

The device according to the invention allows therefore to ensure fluid-tightness of the joint between the rubber pipe and the metallic connection on which it is fitted, and this by winding the band 7 only once, and without the use of any other tensioning device.

I claim:

1. A clamping collar for the attachment of resilient tubular bodies on rigid tubular bodies, comprising a flexible metal band surrounding the resilient tubular body and bent at its ends, a rectangular loop having four sides, and slotted on three of its sides, said loop receiving the ends of the flexible band in overlapping relation, the inner end of which engages, by being bent therearound, with the slotted lower side of the loop, adjustable means carried by and acting with the upper non-slotted side of the loop for clamping the outer end of the flexible band and securing the latter in position, said means also acting for exerting a pressure upon the inner end of the band and securing the latter against the slotted lower side of the loop after tensioning of the said band.

2. A clamping collar for the attachment of resilient tubular bodies on rigid tubular bodies, comprising a flexible metal band surrounding the resilient tubular body, a rectangular loop having four sides and slotted on two lateral sides and on its lower side, said loop receiving the ends of the flexible band, in overlapping relation, one end of said band engaging, by being bent therearound, with the slotted lower side of the said loop, a nut movable in the said loop, a screw in engagement with the nut and freely passing through a smooth hole provided in the non-slotted upper side of the loop, the said screw being adapted to be adjusted to press the nut against the non-slotted upper side of the loop and to compel the lower end of the screw to bear upon the band ends and to secure the band after tensioning, the said flexible band, while it is put under tension, drawing the slotted portions of the loop together and compelling the latter to take the shape of the adjacent surface of the resilient pipe it embraces.

The foregoing specification of my "Clamping collar" signed by me this 24th day of May, 1932.

VLADIMIR ANTOINE de VULITCH.